N. R. WHITE.
SIGNAL.
APPLICATION FILED MAY 2, 1917.

1,295,402.

Patented Feb. 25, 1919.

WITNESSES
G. Hennsey
L. B. Middleton

INVENTOR
Noah R. White,
BY Richard B. Owen,
ATTORNEY

UNITED STATES PATENT OFFICE.

NOAH R. WHITE, OF DELTA, COLORADO.

SIGNAL.

1,295,402.

Specification of Letters Patent.  Patented Feb. 25, 1919.

Application filed May 2, 1917. Serial No. 165,990.

*To all whom it may concern:*

Be it known that I, NOAH R. WHITE, a citizen of the United States, residing at Delta, in the county of Delta and State of Colorado, have invented certain new and useful Improvements in Signals, of which the following is a specification.

This invention relates to new and useful improvements in hay baling machines and the principal object of the invention is to provide means for producing bales of uniform size.

Another object of the invention is to provide means for keeping account of the number of bales passing from the press.

Another object of the invention is to provide an alarm for notifying the operator when a new bale is to be started.

A further object of the invention is to provide simple and efficient means for operating the tabulating device and the alarm.

A further object of the invention is to so form such operating means that the same can be readily placed in the pressing chamber.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings, wherein like characters denote like or corresponding parts throughout the several views, and in which.

Figure 1:
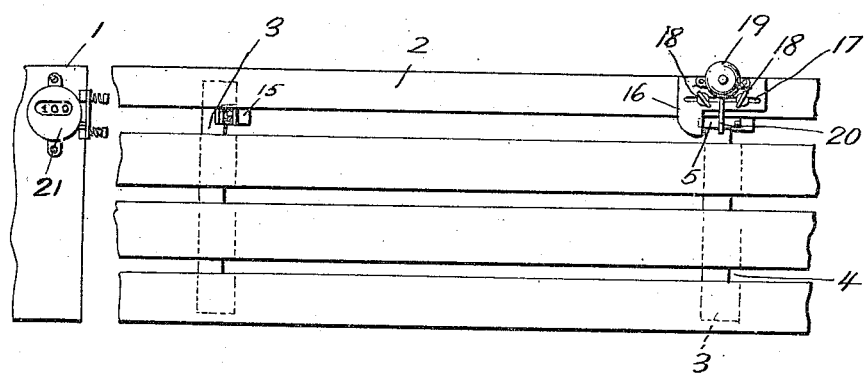
Figure 1 is a side view of part of a hay baling machine with the invention applied thereto.
Figure 2:
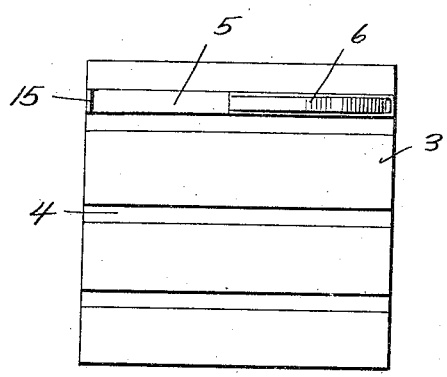
Fig. 2 is an elevation of one of the blocks carrying the invention.
Figure 3:
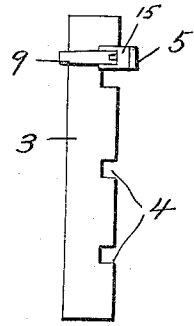
Fig. 3 is an end view of Fig. 2.
Figure 4:
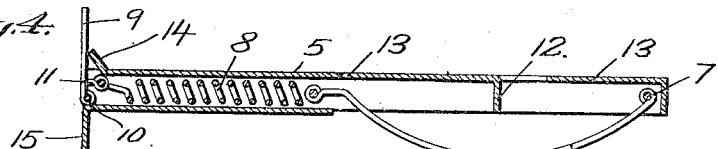
Fig. 4 is a longitudinal, sectional view of the operating device.
Figures 5, 6:
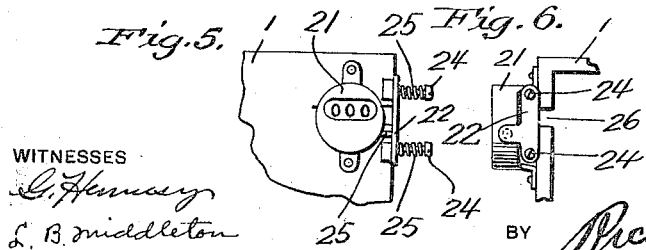
Figs. 5 and 6 are details of the tabulating device.

In these figures, 1 represents part of the pressing chamber in which the bales are formed, while 2 indicates the platform leading from the pressing chamber and adapted to receive the bales as they come from the said chamber. 3 indicates the blocks located between the bales and having the grooves 4 therein for the passage of the baling wire. I enlarge one of these grooves for the insertion of the operating device indicated at 5. This device consists of a casing having a part of one side left open, as indicated in Fig. 4, to receive a spring metal piece 6 having one end pivoted at 7 at the end of the casing and its other end secured to a coil spring 8 located in the casing and being connected at its other end to a bell-striker or hammer 9 pivoted at 10 to the casing. As is shown, the springs normally hold the hammer in the position shown in Fig. 4, that is, at right angles to the casing. This hammer is provided with a cut-out portion bent and curved as at 11 to receive the end of the spring. The casing also has a lug 12 formed by cutting and bending the metal, and this lug prevents the spring 6 from being broken by being forced entirely within the casing. The casing is secured to the block 3 by means of screws passing through the holes 13 formed therein and by the inclined piece 14 at the end of the casing adapted to engage with an inclined, cut-out portion on the block. The casing is also provided with a shield 15 at the end thereof and extending at right angles for preventing the hay from interfering with the operation of the hammer.

16 is a trip for the hammer adjustably secured to the platform by means of the slot 17 and the thumb screws 18. 19 represents any suitable form of bell having its striker 20 projecting into the path of the hammer and located just beyond the trip so that as the hammer is released by the trip the striker will be struck thereby. The bell is carried by the trip plate.

As before stated, the springs hold the hammer at right angles to the block, that is, with the hammer lying against the end of said block. Thus, the block can be easily inserted in the pressing chamber. The walls of the chamber prevent said hammer from swinging out when the springs are compressed by the hay and said hammer is held in this position until it is free of the said walls, but as soon as it enters the space between the slats of the platform it swings outwardly and remains in this position until it comes in contact with the trip 16. This trip forces the hammer back against the end of the block, but just as soon as it leaves the trip it springs forward again, coming into contact with the striker 20 and thus ringing the bell. The operator is thus warned that it is time to insert another block in the pressing chamber. As soon as the blocks are taken from between the bales the hammer assumes its position against the end of the block so it can be readily inserted in the pressing chamber.

In addition to the signal means above described, I also operate a tabulating device by the bell hammer and I accomplish this by a tabulator 21 of any desirable form secured to the edge of the pressing chamber and operated by the hammer 9 as it leaves the pressing chamber coming into contact with a plate 22 connected to the tabulating device by a rod 23 and being secured to the chamber by means of the rods 24 and the coil springs 25. A slot 26 is formed in the chamber so that as the hammer reaches this slot it will swing outwardly and slide the plate on the rods 24 and thus operate the tabulator, said plate being returned to normal position by means of the springs 25.

By this means the number of bales of hay passing from the machine is registered so that the baler can find out by glancing at the tabulator the number of bales he has turned out.

It is thought from the foregoing that the advantages and novel features of my invention will be readily apparent.

I desire it to be understood that I may make slight changes in the construction and in the combination and arrangement of the several parts, provided that such changes fall within the scope of the appended claims.

I claim as my invention:

1. Indicator operating means in coöperative relation with the follower block of a baling press and mounted thereon, the same comprising a hammer adapted to be held pressed inward by contact with the walls of the baling chamber, and a spring co-acting with the hammer and adapted to be tensioned by the compressive force of the bale when the press is in operation to project the hammer into operative position the instant it clears the resisting action of the press.

2. Indicator operating means in coöperative relation with the follower block of a baling press and mounted thereon, the same comprising a hammer adapted to be held pressed inward by contact with the walls of the baling chamber, a flat spring bowed between its ends to project beyond the follower block to be compressed by the bale when the press is in action, said spring being secured at one end and having its opposite end in coöperative relation with the hammer to project the same into operative position the instant it is released from the restraining action of the press.

3. Indicator operating means in coöperative relation with the follower block of a baling press and mounted thereon, the same comprising a hammer adapted to be held pressed inward by contact with the walls of the baling chamber, a flat spring bowed between its ends to project beyond the follower block to be compressed by the bale when the press is in action, said spring being secured at one end, and a coil spring connecting the remaining end of the flat spring with the hammer.

4. Indicator operating means for the follower block of a baling press, comprising a casing having a side partly open, a flat spring within the casing and bowed between its ends to project beyond the open side thereof, one end of the spring being relatively fixed, a hammer pivoted to an end of the casing, and a coil spring within the closed portion of the casing and connecting the movable end of the flat spring with the said hammer.

5. In combination with a baling machine of a casing mounted on each one of the follower blocks, a hammer pivoted at the end of the casing, spring means for holding the hammer against the end of the block, said means including a leaf spring projecting beyond the casing and adapted to be moved inwardly by the pressure of the hay to swing the hammer away from the block, a shield on the casing protecting the hammer from the hay and indicating means operated by the hammer.

In testimony whereof I affix my signature in presence of two witnesses.

NOAH R. WHITE.

Witnesses:
JOHN CARVER,
A. E. PENLEY.

Copies of this patent may be obtained for five cents each, by addressing the "Commissioner of Patents, Washington, D. C."